United States Patent Office 2,796,789
Patented June 25, 1957

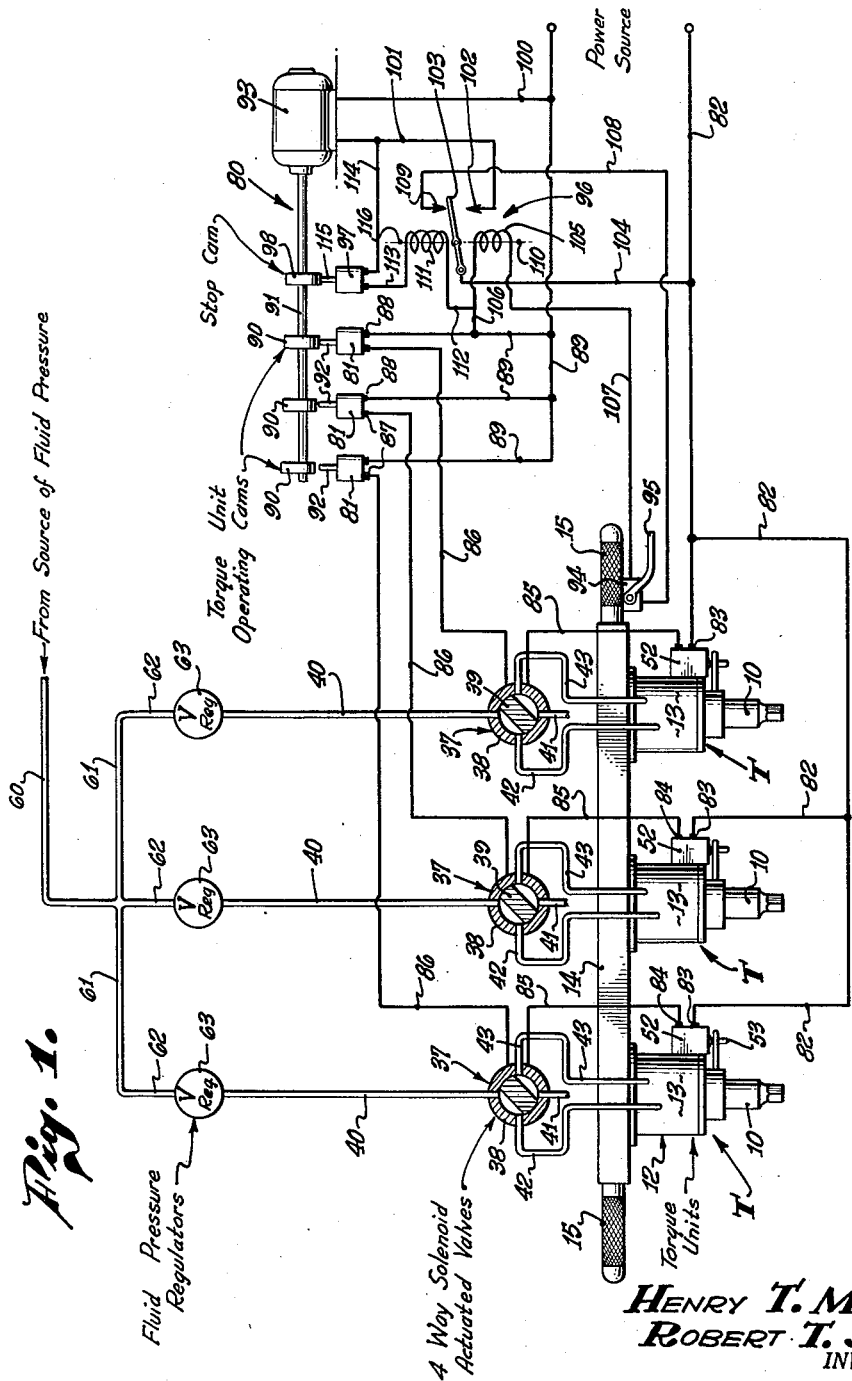

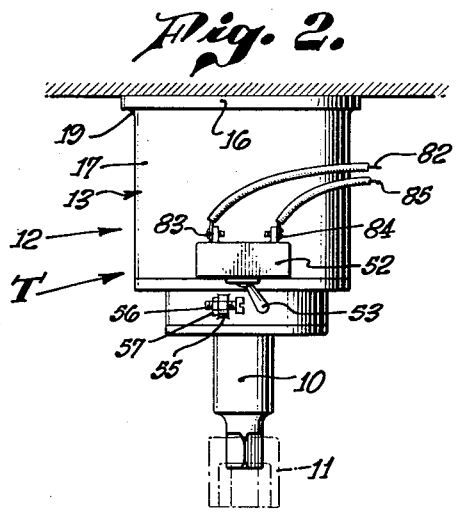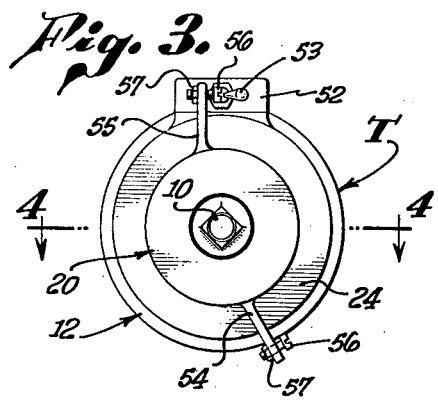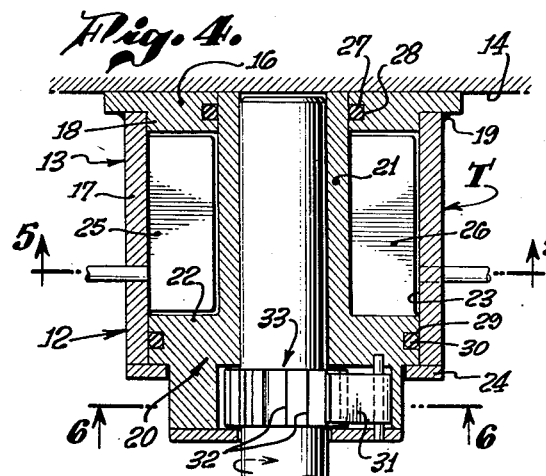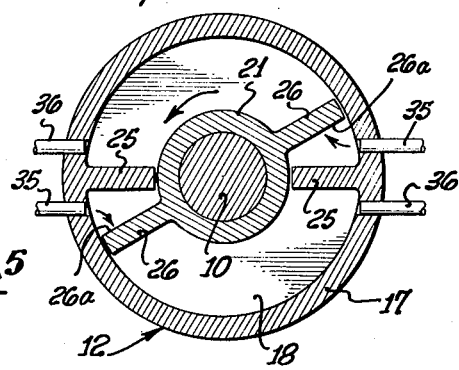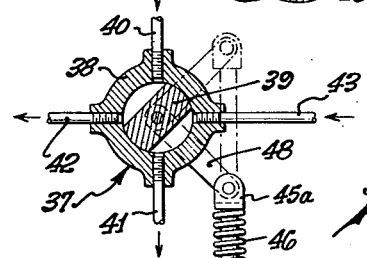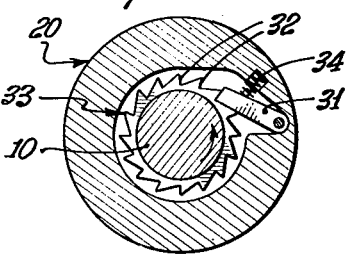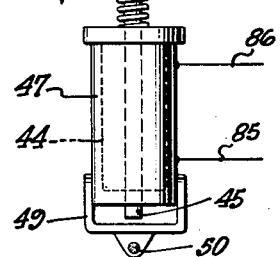

2,796,789

MULTIPLE TORQUE TRANSMITTING APPARATUS FOR TIGHTENING THREADED FASTENING ELEMENTS

Henry T. M. Rice, San Gabriel, and Robert T. Stevens, Altadena, Calif., assignors, by assignment and by decree of distribution, to Adele M. Stevens Application October 20, 1952, Serial No. 315,795

22 Claims. (Cl. 81—52.4)

The present invention relates to torque transmitting apparatus, and more particularly to apparatus for tightening threaded fastening elements, such as nuts, bolts, screws, studs, and the like.

In many types of devices employing threaded fastening elements, it is important that each element be tightened finally to a predetermined torque, to avoid overstressing of the parts, if excessive torque application occurs, or looseness in the parts, if insufficient torque is applied. When a plurality of threaded elements is to be tightened, all elements may not be brought to the final desired degree or degrees of tightness simultaneously. An element may be tightened to the desired extent, but subsequent tightening of an adjacent threaded element may result in looseness or insufficient torque in the previously tightened element. Care must be exercised in applying torque to a plurality of threaded fastening elements to prevent warping of the part to which the elements are attached. Such warping tendency may be eliminated, or at least greatly minimized, by the sequence of tightening of the threaded elements.

Accordingly, an object of the present invention is to provide an improved apparatus for tightening simultaneously a plurality of threaded fastening elements to the desired final torque value or values.

Another object of the invention is to provide an apparatus for tightening a plurality of threaded fastening elements that insures the desired final torque application to each element, despite the tendency of a previously tightened element to loosen for any reason, as the subsequent tightening of an adjacent threaded element, warping of the work, relaxation of the parts, temperature changes of the parts, etc.

Still another object of the invention is to provide an apparatus for simultaneously tightening a plurality of threaded fastening elements, in which the required torque application to each element is maintained after it has been fully tightened, to insure against its loosening upon tightening of one or more other threaded fastening elements, resulting in a final tightening of all of the elements to the predetermined extent or extents.

A further object of the invention is to provide an apparatus capable of simultaneous application to a plurality of threaded fastening elements and of tightening the elements in a predetermined sequence.

Yet another object of the invention is to provide an apparatus capable of simultaneous application to a plurality of threaded fastening elements and of applying the same or different torques to each threaded element, as desired.

Still a further object of the invention is to provide an apparatus for tightening a plurality of threaded fastening elements and embodying individual torque units of comparatively small size, thereby enabling simultaneous application of the units to closely adjacent threaded elements, and gang tightening of the elements to the required torque values.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is a diagrammatic view of an apparatus or system for tightening a plurality of threaded fastening elements;

Fig. 2 is a side elevation of a single torque unit to be applied to a threaded fastening element, and forming part of the structure disclosed in Fig. 1;

Fig. 3 is an enlarged bottom plan view of the unit disclosed in Fig. 2;

Fig. 4 is an enlarged cross-section taken along the line 4—4 on Fig. 3;

Fig. 5 is a cross-section taken along the line 5—5 on Fig. 4;

Fig. 6 is a cross-section taken along the line 6—6 on Fig. 4;

Fig. 7 is a side elevation, with parts shown in section, of one of the four-way solenoid operated valves illustrated in Fig. 1.

As shown in the drawings, and particularly in Figure 1, a plurality of torque units T are provided, which are capable of simultaneous action upon a plurality of threaded fastening elements, in order to tighten the latter to the desired extent or extents. Each torque unit has a spindle 10 to which a wrench socket 11, screw driver bit, or the like, may be secured for application to the threaded fastening element. The axes of the torque units may be arranged in such manner as to enable them to be placed simultaneously in alignment with all of the threaded fastening elements to be tightened. For convenience of disclosure, several aligned and uniformly spaced torque units T are shown in the drawings, but the arrangement of the torque units with respect to each other and the number of torque units may be varied, depending upon the particular device or equipment on which the threaded fastening elements are to be tightened to a desired final torque value or values.

Each torque unit disclosed in the drawings includes a fluid motor 12 that need only operate through a partial revolution, since the units themselves are primarily designed to apply a final torque tightness to the threaded fastening elements that have previously been tightened to some extent. However, each torque unit can be used, if desired, to run down a threaded fastening element and then tighten it to the predetermined torque value.

The housing 13 of each unit 12 is suitably secured to a frame 14, or a supporting structure, that may have handles 15 extending from its opposite ends for manipulation by the operator or operators. The housing 13 of each unit includes an upper end closure 16 (Fig. 4) suitably fastened to the underside of the frame 14 and having a cylindrical portion 17 mounted on a boss 18 of the closure to coaxially relate these parts. The cylindrical housing section 17 and the end closure 16 are suitably secured together in leakproof fashion, as by the use of welding material 19, solder, or the like.

Disposed within the housing or stator 17 is a rotor 20 having a hollow hub portion 21 whose upper end is piloted within the upper end closure 16, and which is also rotatably mounted on the driven shaft or spindle 10 of the torque unit T. This rotor 20 has a lower flange or wall 22 extending outwardly to the inner wall 23 of the stator, the rotor being retained in appropriate position within the stator by a retainer plate or ring 24, which overlaps the end wall 22 of the rotor, and which is suitably secured to the cylindrical portion 17 of the stator, as through use of screws (not shown).

The stator 17 has a plurality, such as a pair, of diametrically opposite vanes 25 integral with its cylindrical portion and extending inwardly toward the hub 21 of the rotor, the inner ends of the vanes preferably making a close sliding fit with the hub periphery. Similarly, the rotor 20 has a plurality of, such as two, diametrically opposite vanes 26 extending radially from the hub toward the inner wall 23 of the stator housing, the outer ends of the rotor vanes making a close sliding fit with the stator wall 23. The stator vanes 25 extend from the upper end closure 16 towards the partition 22 of the rotor, the lower ends of these vanes making a close sliding fit with the inner surface of the partition 22. The upper ends of these vanes 25 may, if desired, abut the end closure 16 to preclude leakage therebetween. In a similar fashion, the rotor vanes 26 may be integral with the end wall 22 of the rotor, or otherwise suitably secured thereto, extending longitudinally of the apparatus, with their upper ends terminating adjacent the inner wall of the end closure 16, with which they make a close sliding fit.

It is apparent that the arrangement of the stator and rotor vanes 25, 26 is such that leakage between the rotor vanes and the stator, on the one hand, and between the stator vanes and the rotor, on the other hand, is substantially prevented. In addition, leakage in an upward direction between the end closure 16 of the stator and the hub 21 is prevented by the provision of a suitable seal ring 27, such as a rubber O ring, in a groove 28 in the end closure 16 and sealingly engaging the periphery of the rotor hub 21. In a similar fashion, the partition or end wall 22 of the rotor 20 has a groove 29 containing a rubber O ring 30, which sealingly engages the inner wall 23 of the cylindrical portion 17 of the stator housing.

It is evident that the stator and rotor vanes 25, 26 are interleaved with respect to each other. Fluid under pressure, such as oil or compressed air, may be caused to enter the housing 13 selectively on either side of the stator vanes 25, in order to urge the rotor vanes 26 and the rotor 20 in one direction or the other. Normally it is desired to rotate the rotor in a particular direction, as in a clockwise direction, for the purpose of tightening right-hand threaded fastening elements. However, it is to be understood that the apparatus could be arranged for rotating the rotor in the opposite direction, in order to rotate left-hand threaded elements and effect their tightening.

As disclosed in the drawings, the rotation of the rotor 20 in the right-hand direction is transmittable to the driven shaft or spindle 10 through an overrunning or one-way clutch, that may assume any desired form. As specifically disclosed, a power pawl 31 is mounted in the rotor, its inner end being engageable with the teeth 32 of a ratchet 33 integral with, or otherwise suitably secured to, the spindle 10. The pawl 31 is urged into engagement with the ratchet teeth 32 by a compression spring 34 bearing against the inner end of the pawl and the rotor itself. Rotation of the rotor 20 in the desired right-hand direction will cause the pawl 31 to engage the ratchet teeth 32 and rotate the ratchet 33 and spindle 10. Rotation of the rotor 20 in the reverse direction will merely cause the power pawl 31 to ratchet back freely over the teeth of the ratchet wheel 33 without imparting any motion thereto. Accordingly, intermittent oscillations of the rotor 20 will transmit unidirectional motion to the ratchet 33 and spindle 10. The apparatus is normally used on operations requiring only a partial revolution of the rotor for effecting the final tightening of the threaded fastening element.

Each torque unit T may have fluid under pressure, such as oil or compressed air, enter the housing 13 on either side of the stationary stator vanes 25. Thus, fluid under pressure may be caused to enter the housing through forward actuating lines 35 that communicate with the housing immediately counter-clockwise of the stationary vanes 25, as disclosed in Fig. 5, in order to act upon the rear faces 26a of the rotor vanes and urge the rotor 20 in a counter-clockwise direction, as seen in Fig. 5, which conforms to a right-hand rotation of the spindle 10 and threaded fastening element. When fluid under pressure enters the forward actuating lines 35 in the manner described, a pair of fluid reversing lines 36 are connected in such manner as to exhaust the housing 13 on the other side of the stationary vanes 25 to atmosphere. These reversing lines 36 communicate with the interior of the housing immediately adjacent the stationary vanes 25 and on the opposite side thereof. As disclosed in Fig. 5, the fluid reversing lines 36 enter the housing 13 immediately clockwise of the stationary vanes. Of course, if reverse rotation of the rotor 20 were desired, then fluid under pressure would be caused to enter the reversing lines 36 and the normal forward actuating lines 35 would be connected to atmosphere, to allow the portion of the housing on the opposite sides of the vanes to have the fluid contained therein exhaust to atmosphere.

The direction in which fluid under pressure is allowed to enter each torque unit T, and to exhaust therefrom is determined by a four-way solenoid type of valve 37, which may be of a conventional structure. As disclosed in Fig. 7, the solenoid valve may include a valve body 38 containing a valve rotor or head 39 which can be shifted through substantially ninety degrees. Fluid under pressure can enter the valve body through a line 40, and fluid may exhaust to atmosphere from the valve body through a diametrically opposite line 41. Disposed substantially at ninety degrees to the inlet pressure and exhaust lines 40, 41 are a pair of aligned fluid lines 42, 43 which communicate with the forward actuating and reversing lines 35, 36 previously referred to. Thus, the valve line 42 disclosed at the left of Fig. 7 is connected to both of the forward actuating lines 35, whereas the other valve line 43 at the right of Fig. 7 is connected to the fluid reversing lines 36. As disclosed in Fig. 7, the valve rotor or head 39 is in a position to allow fluid from the inlet pressure line 40 to flow to the forward actuating lines 42, 35, the fluid reversing lines 36 being connected to the other line 43, which will conduct the fluid within the stator through the exhaust line 41 of the valve to the atmosphere.

The foregoing position of the rotor will be assumed whenever current is passing through the coil 44 of a solenoid. When current so passes through the coil, its associated plunger 45 is drawn into the coil against the force of a compression spring 46 disposed between an end 45a of the plunger and the container 47 for the solenoid coil 44. The end 45a of the plunger is pin connected to a valve arm 48 secured to the valve rotor or head 39. As disclosed in Fig. 7, the solenoid coil 44 has been actuated, to draw the plunger 45 into the coil 44, which places the valve rotor or head 39 in a position for supplying fluid under pressure or other compressed fluid, to the forward actuating lines 35, in order to act upon the rotor vanes 26 and rotate the rotor 20 through a partial revolution in a right-hand direction. When the circuit to the solenoid coil 44 is disrupted, then the return spring 46 becomes effective to shift the plunger 45 outwardly of the coil to the broken line position shown in Fig. 7, which will rotate the valve arm 48 through ninety degrees and place the valve head 39 in a position in which the fluid inlet line 40 is placed in communication with the fluid reversing lines 36, the forward actuating lines 35 then being connected to the exhaust line 41. When this occurs, fluid under pressure acts on the rotor vanes 26, to shift the rotor in the reverse direction and return it to its initial position.

The solenoid 44 is appropriately mounted. As disclosed in Fig. 7, it is secured to a bracket 49 oscillatably mounted upon a pin 50, or the like, in order to avoid interference with shifting of the plunger between the full line and broken line positions disclosed in Fig. 7.

The fluid motor 12 of each torque unit is actually a stall type of mechanism for applying a predetermined torque to a threaded fastening element. The torque applied will depend upon the pressure effective areas of the vanes 26 and the unit pressure of the fluid supplied to the fluid motor. The fluid under pressure will act upon the vanes 26 to rotate the rotor 20 and through the overrunning clutch 31—33, the spindle 10, wrench socket 11 and threaded fastening element, until the latter has been tightened to a torque corresponding to the fluid pressure. The unit is actually designed to apply only a final tightening to a previously tightened threaded fastening element, so that, as a rule, the rotor 20 will only rotate a partial revolution, which is substantially less than the arcuate distances between the opposed stator vanes 25.

In other words, the rotor 20 will stall when the threaded fastening element has been tightened to the predetermined extent, but will continue to exert its tightening force upon the threaded fastening element until the application of fluid pressure is either discontinued, or the socket 11, or equivalent tool, is removed from the threaded fastening element. However, in the event that the rotor rotates to a sufficient extent so that each of its vanes 26 approaches the opposite stator vane 25, then means are provided for automatically returning the rotor 20 to its initial starting position, whereupon fluid pressure can again be applied to the rotor to move it in a direction to further impose a tightening action upon the threaded fastening element. This reverse rotation of the rotor 20 is permitted without reversely rotating the spindle 10, wrench socket 11 and threaded fastening element, inasmuch as the one-way clutch 31—33 will merely overrun, or freewheel, in a reverse direction.

As disclosed in the drawings, a toggle switch 52 is provided for determining the application of current to the solenoid coil 44. So long as the rotor 20 does not move to an extent in which each of its vanes 26 is shifted from one stator vane completely to the other stator vane, current is allowed to pass to the solenoid coil, the toggle switch 52 remaining in closed position. However, if the rotor vanes 26 are shifted close to the opposite stator vanes, then the toggle switch is automatically manipulated to interrupt the circuit to the solenoid coil 44, allowing the return spring 46 to shift the valve head 39, causing the fluid under pressure to pass into the reversing lines 36, and the forward actuating lines 35 allowed to exhaust to atmosphere, the fluid flowing through the reversing lines acting on the rotor vanes 26 to return the rotor 20 to its initial position.

To accomplish control of the circuit to the solenoid, the toggle switch 52 may be of any conventional type, and may be mounted on the stator 13 of the fluid motor 12. A toggle switch arm 53 extends from the switch casing and is disposed in the path of a pair of arms 54, 55 extending outwardly from and fixed to the rotor 20. Each arm may have an adjusting screw 56 threaded into its outer end and held in appropriate adjusted position by a lock nut 57.

The arms 54, 55 are located and displaced arcuately from one another to a lesser extent than the arcuate distance that a rotor vane 26 must move from a position adjacent one stator vane 25 to a position closely approaching the opposite stator vane. As disclosed, the arms 54, 55 will be arranged substantially less than 180 degrees from each other. In the event that a rotor vane 26 approaches an opposite stator vane, then the adjusting screw 56 on a circuit opening arm 54 will engage the toggle switch arm 53 and snap it over into a position opening the circuit to the solenoid coil 44. Such action allows the return spring 46 to shift the valve head 39 to a position exhausting fluid from the forward actuating lines 35 and placing the fluid reversing lines 36 in communication with the fluid pressure inlet line 40. The fluid under pressure will then pass into the stator housing 13 and act on the opposite faces of the rotor vanes 26 for the purpose of returning the rotor to its initial starting position, the power pawl 31 merely freely overrunning or ratcheting past the teeth 32 of the ratchet 33 without imparting any motion to the driven shaft or spindle 10. As the rotor reaches its initial position, the adjusting screw 56 on the other or circuit closing arm 55 engages the arm 53 of the toggle switch 52 and shifts it back to its initial position, closing the circuit through the solenoid coil 44, whereupon the solenoid is again energized to attract the plunger 45 against the force of the return spring 46, shifting the valve rotor 39 to the position disclosed in Fig. 7, in which air under pressure can again enter the stator housing 13 through the forward actuating lines 35, the reversing lines 36 being again placed in communication with atmosphere. The fluid under pressure will act on the rotor vanes 26 and the force associated therewith will be exerted through the overrunning clutch 31—33 to the spindle 10, and from the latter through the wrench socket 11 to the threaded fastening element, in order to further rotate the latter until it is tightened to the desired degree.

The foregoing cycle of operation will be repeated automatically as often as necessary until the threaded fastening element has been tightened to the predetermined extent. However, as stated above, one use of the apparatus is in connection with a threaded fastening element that has already been tightened to some extent, so that it should only be necessary for the rotor 20 to be shifted by the fluid under pressure to a comparatively small arcuate extent until the fluid motor stalls, which indicates that the threaded fastening element has been tightened to the predetermined torque value.

The fluid pressure applied to the fluid motor 12 of each torque unit T may be selected in accordance with the torque to be applied to the threaded fastening element. All of the torque units T mounted on the frame 14 may have the same pressure applied thereto, or the pressure may be varied, as desired. The fluid pressure is obtained from a suitable source (not shown) which flows through a line 60 to a manifold 61 branching to a plurality of other inlet lines 62 leading to fluid pressure regulator valves 63, there being one of the regulator valves for each of the solenoid actuated valves 37 and torque units T. The outlet from each of these valves 63 communicates with the line 40 leading to the high pressure inlet in the valve body 38. By suitably adjusting each pressure regulator 63, the desired pressure of the fluid may be determined for introduction into each fluid motor 12, in order to actuate its rotor 20 until a stall condition occurs, which corresponds to the desired torque tightness imparted to the threaded fastening element.

All of the torque units T may be actuated simultaneously, or they may be actuated in any desired sequence. As an example, in tightening the nuts or studs on an internal combustion engine cylinder head, it may be desired to effect their tightening in a desired sequence, for the purpose of minimizing warping and distortion of the cylinder head. Accordingly, the circuits to the solenoid actuated valves 37 are closed in a predetermined sequence, and this sequence is governed by a timer or "program" mechanism 80 now to be described. Of course, the circuits could all be completed simultaneously, to achieve simultaneous tightening of the threaded fastening elements, or the programming device can be set to secure actuation of the torque units T in any desired or required sequence.

As disclosed in Fig. 1, each solenoid coil 44 is connected to a suitable source of electric energy, the coil being connected in series with the toggle switch 52 mounted on each torque unit, and also with a valve switch 81 which forms part of the programming or timing unit 80. Thus, a conductive line 82 runs from a source of power and is connected to one terminal 83 of each toggle switch 52, the other terminal 84 of this latter switch being connected to the solenoid coil 44 through the lead 85. Another line 86 runs from each solenoid coil 44 to one terminal 87 of a program switch 81, the other terminal 88 of this latter switch being connected to the other pole of the power source through the lead 89.

It is, accordingly, apparent that the circuit through each solenoid valve 37 is completed when the toggle switch 52 is in closed position, which is its normal condition, and also when the program or timer switch 81 is in closed position. The timer switches 81 normally inherently assume an open position, being actuated to a closed position by a cam 90 mounted on a cam shaft 91 and adapted to engage a switch actuating plunger 92. There is one cam 90 for each timer switch 81, and, as indicated above, there is one timer switch in each solenoid valve circuit. The cams 90 on the cam shaft 91 may be related to each other to engage their respective switch plunger 92 and close all of the switches 81 simultaneously or in any sequence.

The cams 90 are rotated at a proper speed by a suitable electric timer motor 93 connected thereto, usually through a speed reducing mechanism that will rotate the shaft 91 in a relatively slow manner, to afford ample opportunity for the torque units T to accomplish their operations. This timer motor 93 is caused to start by a manual starting switch 94 that may be conveniently mounted on the frame 14 of the apparatus adjacent one of the handles 15, so as to be conveniently manipulated by an operator who can grasp the switch lever 95. The circuit through the timer motor 93 is controlled indirectly by the manual starting switch 94, the circuit itself being completed or disrupted by a solenoid actuated toggle switch 96, the actuation of which is not only determined by the manual starting switch 94, but also by a stopping switch 97 that is normally in a closed position, but which may be actuated by a cam 98 secured on the cam shaft 91 to engage the switch plunger 115 and shift the switch 97 to an open position.

The circuit through the timer motor 93 consists of a line 100 connected to one pole of the power source, another line 101 leading from the timer motor to one of the contacts 102 of the solenoid actuated toggle switch 96. When this contact 102 is engaged by the toggle switch arm 103, then the circuit to the timer motor 93 is completed, in view of another lead 104 running from the arm to the line 82 running to the other pole of the power source. Normally the toggle switch arm 103 is in the circuit opening position illustrated in Fig. 1, but is movable into engagement with the contact 102 to complete the circuit to the motor 93 when current is caused to pass through a solenoid coil 105. The circuit through this coil 105 runs from one of the main power lines 89 and through a lead 106 to one end of the coil and from the other end of the coil through a line 107 to one terminal of the manual starting switch 94, which is normally in open position. The other terminal of this switch is connected to a lead 108 connected to another contact 109 forming part of the solenoid actuated toggle switch 96, this contact being engaged by the switch arm 103. As stated above, this arm is connected through the lead 104 to another line 82 of the power source, in order to complete the circuit through the solenoid coil 105 when the lever 95 is actuated to close the manual starting switch 94.

When the lever 95 has been actuated to close the switch 94, the circuit through the solenoid coil 105 is completed, causing the solenoid plunger 110 to be attracted, to shift the toggle switch arm 103 into engagement with the other contact 102, where it will remain because of the toggle character of the switch 96, despite release of the manual starting switch lever 95 to open the manual switch 94. Engagement of the switch arm 103 with this contact 102 completes the circuit through the timer motor 93, which then begins rotating to rotate the cam shaft 91 and the cams 90, 98. When the cam shaft has rotated sufficiently to cause the various cams to actuate the several valve switches 81 and cause each torque unit to fully tighten the threaded fastening element to which it is connected to the preselected torque values, then the stopping cam 98 on the cam shaft 91 will close the circuit through the stopping switch 97, this switch being connected in series with another solenoid coil 111 forming part of the solenoid actuating toggle switch 96. The circuit through this coil extends from one line 89 of the power source through the lead 112 at one end of the coil 111, the other end of the coil being connected through a lead 113 to one terminal of the stop switch 97, the other terminal of the stopping switch being connected to a line 114, which is connected to the line 101 running from the timer motor 93, which runs to the switch contact 102. This contact 102 will be engaged by the toggle switch arm 103 while the timer motor 93 is rotating, the switch arm 103, as described above, being connected to the other line 82 of the power source through the lead 104. As stated, the stopping switch 97 is normally in open position, but when the stopping cam 98 has been rotated to its position into engagement with the switch plunger or member 115, the stopping switch 97 is shifted to a closed position, to complete the circuit through the other solenoid coil 111, which causes the plunger 116 extending into the coil to be attracted to shift the toggle switch arm 103 back to its initial position in engagement with the switch contact 109, thereby disrupting the circuit to the timer motor 93 and allowing the timer motor to come to rest. Despite the fact that the switch arm 103 has now reengaged the contact 109, the circuit to the other solenoid coil 105 is still open, since the manual starting switch 94 is in open position. The timer motor 93 will not be reactivated until the manual switch lever 95 is again manipulated to close the circuit through the solenoid coil 105.

The operation of the apparatus can now be reviewed. Let it be assumed that the cams have been so related on the cam shaft 91 with respect to each other as to actuate the solenoid valve switches 81 in a predetermined sequence, as, for example, to close simultaneously the outer switches 81 (as seen in Fig. 1) and to then close the intermediate switch 81, for the purpose of first securing the tightening of the threaded fastening elements associated with the outer torque units T, and then secure the tightening of the threaded fastening element associated with the intermediate torque unit T.

The manual switch 94 is closed to effect engagement of the toggle arm 103 with the contact 102 and produce rotation of the motor 93, which rotates the cam shaft 91. The two outer cams 90 will engage the outer switch plungers 92 to close the outer solenoid valve switches 81, thereby completing the circuit to the solenoid coils 44 to the two end torque units. The intermediate cam 90, under the assumed example, has not as yet engaged its switch member 92 to close the switch 81 and the circuit for the intermediate solenoid valve 37. Upon completion of the circuit to the outer solenoid coils 44, their plungers 45 are actuated to shift their valve members 39 to the positions disclosed in Fig. 7, which allows fluid under pressure to pass through the forward actuating lines 35 of the outer torque units, the fluid under pressure acting on the vanes 26 and rotating the rotor 20 in a right-hand direction, this motion being transmitted through the overrunning clutches 31—33, through the spindles 10 and sockets 11 to the threaded fastening elements, tightening these elements to the extent at which each rotor stalls and cannot turn any further. The torque tightness is, of course, dependent upon the pressure of the fluid passing through the lines 40, 42, 35, as determined by the adjustment of the fluid pressure regulator 63. The torque application will be maintained on these end or outer threaded fastening elements, since the fluid pressure is still acting on the rotor vanes 26, despite the fact that the rotors 20 have stalled. The cam 90 between the other outer cams will now have been rotated by the timer motor to a position in which it engages and closes the other, intermediate switch 81, to close the circuit through the intermediate solenoid valve 37, the solenoid thus being energized to shift its associated valve head or rotor 39 to the position disclosed in Fig. 7, which allow a fluid under pressure to enter the torque unit T through its forward actuating lines 35 to act upon the rotor vanes 26 and rotate the rotor 20, and through the overrunning clutch 31—33, the spindle 10 and wrench socket 11 to tighten the intermediate threaded fastening element to the extent at which the rotor 20 will stall, which insures that a predetermined torque tightening has taken place.

In the event that tightening of the intermediate threaded fastening element against the work may have tended to produce some relief of the tightness of the other previously tightened threaded fastening elements, then such other threaded fastening element or elements are retightened to their proper torque value, since the fluid under pressure is still acting on their respective rotor vanes 26. As a result, all of the units will be in a stalled position, exerting their predetermined torques upon the threaded fastening elements, thereby insuring that all of the threaded fastening elements will be tightened to the desired predetermined torque values.

The stopping cam 98 of the cam shaft 91 is so related in position and shape that the other operating cams 90 will have completed the circuits to all of the solenoid actuated valves 37, and allowed all of the torque units T to fully accomplish their functions, before the stopping cam 98 engages the actuating element 115 of the stopping switch 97, to complete the circuit through the other solenoid coil 111 of the solenoid actuated toggle switch 96. When the stopping cam 98 so closes its switch 97, the solenoid coil 111 is energized to shift the toggle arm 103 back to its initial position out of engagement with the switch contact 102, and into engagement with the other switch contact 109, thereby opening the circuit to the timer motor 93 and allowing it to come to rest, thereby completing a cycle of operation of the entire mechanism.

The specific apparatus disclosed is primarily designed for accomplishing a final tightening of threaded fastening elements that have previously been tightened. As an example, the nuts of an engine cylinder head may have been previously tightened to a desired torque value and the engine then operated for testing, or other purposes. While the engine is in a hot condition, it is desired to reapply torque to its nuts, in order to assure their proper tightness against the cylinder head. Accordingly, the rotors 20 of the torque units T need only operate through a fraction of a revolution, to insure the proper torque tightness of each threaded fastening element against the cylinder head, and the extent of this movement is normally insufficient to actuate any of the toggle switches 52. However, should a rotor 20 move to a sufficient extent to actuate a a toggle switch 52, then the circuit to that particular solenoid valve 37 will be opened, to cause the valve 37 to shift to its reverse position, in order to return the rotor 20 to its initial starting point, whereupon the toggle switch 52 is again shifted by the arm 55 to a closed position, to reenergize the coil 44 of the solenoid valve 37 and shift it to a forward actuating position, whereupon additional torque and motion is imparted by the rotor 20 through the overrunning clutch 31—33 and spindle 10 to the particular threaded fastening element, until the rotor 20 stalls. The cams 90, 98 are so designed as to allow sufficient time for repeated application of torque to each threaded fastening element to take place, through reversal in the motion of the rotor 20, before the circuits through the solenoid valves 37 are opened. Of course, the stopping cam 98 will not stop the timer motor 93 until the torque unit operating cams 90 have been rotated to a position allowing the valve switches 81 to reopen and thereby effect shifting of all of the rotors 20 back to their initial starting point, for the purpose of relieving the torque units T of the application of a torquing or turning effort to the threaded fastening elements.

It is, accordingly, apparent that an apparatus and system has been provided which insures the tightening of a plurality of threaded fastening elements to a predetermined degree of torque. The torque effort is being steadily applied to all threaded fastening elements, so that any subsequent tightening of an element, which may tend to relieve a previously tightened fastening element of some of its holding force, will result in a retightening of the latter, producing a final tightening of all threaded fastening elements to the desired degree. This extent of tightening may be the same or may be different, depending upon the selection of the fluid pressure by appropriate adjustment of the fluid pressure regulator 63. The threaded fastening elements may be tightened simultaneously or they may be tightened in any desired sequence, to avoid warpage or distortions in the work. The torque application involves relatively slow moving parts, avoiding errors in the tightening of the threaded fastening elements due to vibration, inertia forces and motor impulses. In addition, the friction of each torque unit is very low, and the slow application of the torque minimizes any tendency of the parts to relax, which may be accompanied by errors in the extent to which the threaded fastening element has been tightened. The slow application of the turning effort or torque also minimizes heating and galling of the work. Moreover, the final torque application is independent of the skill of the operator, being determined entirely by the pressure of the fluid directed to each torque unit.

The inventors claim:

1. In apparatus for tightening a threaded fastening element: a driven member adapted to be coupled to the element; a motor; means including an overrunning clutch for transmitting the motion of said motor to said driven member; means for energizing said motor to produce its actuation and rotation of said driven member through said clutch in one direction; and means responsive to movement of said motor to a predetermined extent for producing actuation of said motor in the opposite direction without rotating said driven member in said opposite direction.

2. In apparatus for tightening a threaded fastening element: a unit for applying torque to the threaded fastening element, said unit embodying a fluid motor; means for conducting fluid under pressure to said motor to produce its actuation in one direction comprising valve means for determining the passage of fluid to said motor; electromagnetic means for actuating said valve means; an electric circuit for said electromagnetic means; and means responsive to operation of said unit to a predetermined degree for controlling said circuit.

3. In apparatus for tightening a threaded fastening element: a unit for applying torque to the threaded fastening element, said unit embodying a fluid motor; means for conducting fluid under pressure to said motor to produce its actuation in one direction comprising valve means for determining the passage of fluid to said motor; electromagnetic means for actuating said valve means; an electric circuit for said electromagnetic means; and means responsive to movement of said motor to a predetermined extent in said one direction for controlling said circuit.

4. In apparatus for tightening a threaded fastening element: a unit for applying torque to the threaded fastening element, said unit embodying a fluid motor; means for conducting fluid under pressure to said motor comprising valve means for determining passage of fluid to said motor; electromagnetic means for actuating said valve means to enable said conducting means to feed fluid under pressure to said motor to produce its actuation in one direction; an electric circuit for said electromagnetic means; and means responsive to movement of said motor to a predetermined extent in one direction for opening said circuit to enable shifting of said valve means to a position preventing further feeding of fluid to said motor to actuate said motor in said one direction.

5. In apparatus for tightening a threaded fastening element: a unit for applying torque to the threaded fastening element, said unit embodying a fluid motor; means for conducting fluid under pressure to said motor to actuate said motor selectively in opposite directions comprising valve means selectively positionable to determine the actuation of said motor; electromagnetic means for actuating said valve means to a position enabling said conducting means to feed fluid under pressure to said motor to produce actuation of said motor in one direction; and means responsive to movement of said motor to a predetermined extent in said one direction for causing said electromagnetic means to actuate said valve means to a position enabling said conducting means to feed fluid under pressure to said motor to produce actuation of said motor in the reverse direction.

6. In apparatus for tightening a threaded fastening element: a unit for applying torque to the threaded fastening element, said unit embodying a fluid motor; means for conducting fluid under pressure to said motor to actuate said motor selectively in opposite directions comprising valve means selectively positionable to determine the actuation of said motor; electromagnetic means for actuating said valve means to a position enabling said conducting means to feed fluid under pressure to said motor to produce actuation of said motor in one direction; and means responsive to operation of said unit to a predetermined degree to cause said electromagnetic means to actuate said valve means to a position enabling said conducting means to feed fluid under pressure to said motor to produce actuation of said motor in the reverse direction.

7. In apparatus for tightening a threaded fastening element: a fluid motor including a driven member; means for conducting fluid under pressure to said motor to actuate said motor selectively in opposite directions comprising valve means selectively positionable to determine the direction of actuation of said motor; electromagnetic means for actuating said valve means to a position enabling said conducting means to feed fluid under pressure to said motor to produce actuation of said motor and driven member in one direction; an electric circuit for said electromagnetic means including a switch; and means on said driven member engageable with said switch upon movement of said driven member to a predetermined extent in said one direction to open said circuit to cause said electromagnetic means to actuate said valve means to a position enabling said conducting means to feed fluid under pressure to said motor to produce actuation of said motor in the reverse direction.

8. In apparatus for tightening a threaded fastening element: a unit for applying torque to the threaded fastening element, said unit embodying a fluid motor; means for conducting fluid under pressure to said motor to produce its actuation in one direction comprising valve means for determining the passage of fluid to said motor; electromagnetic means for actuating said valve means; an electric circuit for said electromagnetic means; and a timing mechanism controlling said circuit.

9. In apparatus for tightening a plurality of threaded fastening elements: a supporting structure; a plurality of torque units on said structure for simultaneous application to the threaded fastening elements, each unit embodying a motor; means for energizing each of said motors to produce its actuation to tighten the threaded fastening element; and means controlling the energization of said motors in a predetermined sequence to initiate operation of said motors and tightening of the threaded fastening elements in sequence.

10. In apparatus for tightening a plurality of threaded fastening elements: a supporting structure; a plurality of torque units on said structure for simultaneous application to the threaded fastening elements, each unit embodying a fluid motor; means for conducting fluid under pressure to said motors including a control valve for each motor; and means for operating said valve in a predetermined sequence to initiate operation of said motors and tightening of the threaded fastening elements in sequence.

11. In apparatus for tightening a plurality of threaded fastening elements: a supporting structure; a plurality of torque units on said structure for simultaneous application to the threaded fastening elements, each unit embodying a fluid motor; means for conducting fluid under pressure to said motors including a control valve for each motor; and means for opening said valves in a predetermined sequence to initiate operation of said motors and tightening of the threaded fastening elements in sequence; said valves remaining open after initiation of the operation of all motors to obtain simultaneous application of torque by all motors.

12. In apparatus for tightening a plurality of threaded fastening elements: a supporting structure; a plurality of torque units on said structure for simultaneous application to the threaded fastening elements, each unit embodying a motor; means for energizing each of said motors to produce its actuation to tighten the threaded fastening element; and means controlling the energization of said motors in a predetermined sequence to initiate operation of said motors and tightening of the threaded fastening elements in sequence; said controlling means maintaining the energization of all of said motors, after initiation of the operation of all of said motors, to obtain simultaneous application of torque by all of said motors to the threaded fastening elements.

13. In apparatus for tightening a plurality of threaded fastening elements: a supporting structure; a plurality of torque units on said structure for simultaneous application to the threaded fastening elements, each unit embodying a fluid motor; means for conducting fluid under pressure to said motors including a control valve for each motor; electromagnetic means for operating each valve; an electric circuit for each electromagnetic means; and means for closing each circuit in a predetermined sequence to cause said electromagnetic means to operate each of said valves in sequence to initiate sequential operation of said motors for the purpose of tightening the threaded fastening elements in sequence.

14. In apparatus for tightening a plurality of threaded fastening elements: a supporting structure; a plurality of torque units on said structure for simultaneous application to the threaded fastening elements, each unit embodying a fluid motor; means for conducting fluid under pressure to said motors including a control valve for each motor; electromagnetic means for operating each valve; an electric circuit for each electromagnetic means; and means for simultaneously closing said circuits.

15. In apparatus for tightening a threaded fastening element: a driven member adapted to be coupled to the element; a motor; means including an overrunning clutch for transmitting the motion of said motor to said driven member; means for energizing said motor to produce its actuation and rotation of said driven member through said clutch in one direction; means responsive to movement of said motor to a predetermined extent for producing actuation of said motor in the opposite direction without rotating said driven member in said opposite direction; and means responsive to movement of said motor to a predetermined extent in said opposite direction for again energizing said motor to produce its actuation in said one direction to impart turning effort to said driven member through said clutch in said one direction.

16. In apparatus for tightening a threaded fastening element: a driven member adapted to be coupled to the element; a fluid motor; means including an overrunning clutch for transmitting the motion of said fluid motor to said driven member; means for supplying fluid under pressure to said motor to produce its actuation in one direction to rotate said driven member through said clutch in said one direction; and means responsive to movement of said motor to a predetermined extent in said one direction for producing actuation of said motor in the opposite direction without rotating said driven member in said opposite direction.

17. In apparatus for tightening a threaded fastening element: a driven member adapted to be coupled to the element; a fluid motor; means including an overrunning clutch for transmitting the motion of said fluid motor to said driven member; means for supplying fluid under pressure to said motor to produce its actuation in one direction to rotate said driven member through said clutch in said one direction; means responsive to movement of said driven member to a predetermined extent in said one direction for discontinuing the supply of fluid under pressure to said motor to produce its actuation in said one direction and for effecting actuation of said motor in the opposite direction without rotating said driven member in said opposite direction; and means responsive to movement of said motor to a predetermined extent in said opposite direction for again supplying fluid under pressure to said motor to produce its actuation in said one direction to impart turning effort to said driven member through said clutch in said one direction.

18. In apparatus for tightening a threaded fastening element: a driven member adapted to be coupled to the element; a fluid motor; means including an overrunning clutch for transmitting the motion of said fluid motor to said driven member; means for supplying fluid under pressure to said motor to produce its actuation in one direction to rotate said driven member through said clutch in said one direction; and means responsive to movement of said motor to a predetermined extent in said one direction for directing fluid under pressure to said motor to produce its actuation in the opposite direction without rotating said driven member in said opposite direction.

19. In apparatus as defined in claim 16; wherein said fluid motor comprises a stator having one or more vanes, a rotor having one or more vanes and connected to said overrunning clutch; said fluid supply means conducting fluid between said one or more stator vanes and one or more rotor vanes to rotate said rotor in said one direction.

20. In apparatus as defined in claim 18; wherein said fluid motor comprises a stator having one or more vanes, a rotor having one or more vanes and connected to said overrunning clutch; said fluid supply means and fluid directing means conducting fluid between said one or more stator vanes and one or more rotor vanes to rotate said rotor selectively in said one direction or said opposite direction.

21. In apparatus for tightening a threaded fastening element: a driven member adapted to be coupled to the threaded fastening element; a fluid motor; means including an overrunning clutch for transmitting the motion of said motor to said driven member; means for conducting fluid under pressure to said motor to actuate said motor selectively in opposite directions comprising valve means selectively positionable to determine the actuation of said motor; electromagnetic means for actuating said valve means to a position enabling said conducting means to feed fluid under pressure to said motor to produce actuation of said motor in one direction; and means responsive to movement of said motor to a predetermined extent in said one direction for causing said electromagnetic means to actuate said valve means to a position enabling said conducting means to feed fluid under pressure to said motor to produce actuation of said motor in the reverse direction.

22. Apparatus as defined in claim 21; wherein said fluid motor comprises a stator having one or more vanes, a rotor having one or more vanes and connected to said overrunning clutch; said fluid conducting means conducting fluid between said one or more stator vanes and one or more rotor vanes to rotate said rotor selectively in said one direction or said reverse direction.

References Cited in the file of this patent

UNITED STATES PATENTS

| | | |
|---|---|---|
| 1,479,178 | Harvey | Jan. 1, 1924 |
| 2,069,882 | Hall | Feb. 9, 1937 |
| 2,299,956 | Stever | Oct. 27, 1942 |
| 2,360,059 | Hohwart | Oct. 10, 1944 |
| 2,379,878 | Bronander | July 10, 1945 |
| 2,552,840 | Burke et al. | May 15, 1951 |
| 2,602,361 | Meyer et al. | July 8, 1952 |
| 2,616,323 | Leifer | Nov. 4, 1952 |